United States Patent
Peuser et al.

(10) Patent No.: US 9,647,478 B2
(45) Date of Patent: May 9, 2017

(54) METHOD AND DEVICE FOR DISCHARGING AN ELECTRICAL NETWORK

(71) Applicant: Robert Bosch GmbH, Stuttgart (DE)

(72) Inventors: Thomas Peuser, Ludwigsburg (DE); Thomas Merkel, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 524 days.

(21) Appl. No.: 13/918,813

(22) Filed: Jun. 14, 2013

(65) Prior Publication Data
US 2013/0335004 A1    Dec. 19, 2013

(30) Foreign Application Priority Data
Jun. 14, 2012    (DE) .................. 10 2012 210 008

(51) Int. Cl.
*H02J 7/00*    (2006.01)
*H02J 1/08*    (2006.01)
*H02J 1/00*    (2006.01)

(52) U.S. Cl.
CPC ............ *H02J 7/007* (2013.01); *H02J 1/08* (2013.01); *H02J 7/0065* (2013.01); *H02J 2001/008* (2013.01)

(58) Field of Classification Search
CPC .......... H02J 7/0065; H02J 7/0054; H02J 1/08; H02J 2001/008
USPC ............................................... 320/103, 127
See application file for complete search history.

(56) References Cited

U.S. PATENT DOCUMENTS

| | | | |
|---|---|---|---|
| 7,196,492 B2* | 3/2007 | Sugiura ............... | B60L 11/1887 320/101 |
| 2003/0118876 A1 | 6/2003 | Sugiura et al. | |
| 2009/0236915 A1* | 9/2009 | Yoshida ............... | H02J 7/0013 307/77 |
| 2010/0026248 A1* | 2/2010 | Barrade ............... | H02J 7/0054 320/166 |
| 2011/0140680 A1* | 6/2011 | Heo ..................... | G05F 1/67 323/304 |
| 2013/0127247 A1* | 5/2013 | Oh ....................... | B60L 11/14 307/10.1 |

(Continued)

FOREIGN PATENT DOCUMENTS

| | | |
|---|---|---|
| CN | 1855666 | 11/2006 |
| CN | 101743679 | 6/2010 |
| CN | 101779356 | 7/2010 |

(Continued)

*Primary Examiner* — Nathaniel Pelton
(74) *Attorney, Agent, or Firm* — Michael Best & Friedrich LLP

(57) ABSTRACT

A method, a device and an electrical system for discharging a first electrical network. The first electrical network comprises in particular an intermediate circuit which comprises in particular an intermediate-circuit capacitor. The first electrical network is connected to a second electrical network by means of a DC-DC converter for this purpose. The first electrical network is discharged by means of the DC-DC converter. At the same time, the DC-DC converter transfers electrical energy into the second electrical network. For discharging, the output voltage of the DC-DC converter is set to a first voltage value, which is larger than the nominal voltage of the second electrical network. For discharging, the output voltage of the DC-DC converter is set to the first voltage value for a predefinable first period of time.

10 Claims, 2 Drawing Sheets

(56) References Cited

U.S. PATENT DOCUMENTS

2013/0127399 A1* 5/2013 Tang ................... B60L 1/003
320/104
2013/0338862 A1* 12/2013 Guerin ................ B60L 11/1814
701/22

FOREIGN PATENT DOCUMENTS

| CN | 102795119 | | 11/2012 |
|----|-----------|---|---------|
| DE | 19903427 | | 8/2000 |
| DE | 102004057693 | | 6/2006 |
| WO | WO2012018206 | * | 2/2012 |

* cited by examiner

METHOD AND DEVICE FOR DISCHARGING AN ELECTRICAL NETWORK

BACKGROUND OF THE INVENTION

The invention relates to a method and a device for discharging an electrical network and to an electrical system.

It is known to use in a motor vehicle an electrical machine which on the one hand is used as a starter and on the other hand as a generator. An electrical machine of this type is also called a starter generator. In this case, the electrical circuit is such that the electrical machine is connected to the onboard power supply network and the battery via an inverter, for example a pulse-controlled inverter. When starting, the electrical machine draws the necessary electrical power from the vehicle battery, wherein the current supplied by the battery is converted in particular into a three-phase alternating current using the pulse-controlled inverter, said current driving the electrical machine which, in this case, is acting as a starter motor. During the start process, the electrical machine, which is normally connected to the crankshaft, therefore brings the internal combustion engine of the vehicle up to the required starting rotational speed. After the starting process, the electrical machine is driven by the internal combustion engine and acts as a generator. The generator therefore generates the electrical energy necessary for supplying the onboard power supply network or charging the battery. The output voltage of the electrical machine operating as a generator is regulated to predefinable voltage values using a voltage regulator, for example by influencing the field current, and is rectified using the pulse-controlled inverter. For intermediate storage or transferring electrical energy, electrical systems of this type having electrical machine, generator, pulse-controlled inverter and battery usually also have an intermediate-circuit capacitor. In this case, the intermediate-circuit capacitor charges up to at least the voltage supplied by the electrical machine.

If an electrical system of this type is used in connection with a traction network at a higher voltage, at least one more DC DC converter, which is connected such that it lies between the fraction network at a higher voltage and the onboard power supply network at low voltage, is usually present. In this case, the traction network supplies with electrical energy an electrical machine which acts as the vehicle drive. An example of an arrangement of this type is described in DE 199 03 427 A1.

Particularly in a traction network at a higher voltage, in which the intermediate-circuit capacitor is also at a higher voltage, it must be ensured that the intermediate-circuit capacitor is discharged in a relatively short time after switch-off. For example, it is required that the voltage across the intermediate-circuit capacitor has dropped to below 60 volts within 5 seconds of the pulse-controlled inverter being switched off. In the case of systems used at present, the discharging of the intermediate-circuit capacitor takes place via a resistor connected in parallel, by means of which the intermediate-circuit capacitor or, optionally, the intermediate-circuit capacitors is/are discharged, wherein it is also possible for said resistor to be connected in using a relay when the pulse-controlled inverter is switched off. A discharge circuit is known from DE 10 2004 057 693, in which the traction network is discharged by means of the DC DC converter, which is arranged between the traction network and the onboard power supply network, and, at the same time, the electrical energy is transferred into the onboard power supply network.

The considerations and implementations to date use exclusively static considerations. In this case, only static, that is to say permanently occurring, voltages are taken into consideration. For temporary, that is to say dynamic, considerations however, some exceptions apply, of which the so-called load dump pulse is used in the method presented here. The term "load dump" is understood to mean the occurrence of voltage spikes in the motor-vehicle onboard power supply network. These occur at the instant at which high-power loads of the onboard power supply network are switched off and the loading of the onboard power supply network suddenly decreases. Said voltage spikes or voltage pulses, that is to say dynamically maximum voltages, occur in principle in every onboard power supply network and must be afforded tolerance by each control device according to the specifications.

By way of example, such voltage spikes are permissible if they do not last longer than 400 ms and do not exceed an electrical voltage of 35 volts. The permissibility of voltage spikes of this type in the onboard power supply network is used in the invention described here.

SUMMARY OF THE INVENTION

A method for discharging a first electrical network is provided according to the invention. The first electrical network comprises in particular an intermediate circuit, which comprises in particular an intermediate-circuit capacitor. For this purpose, the first electrical network is connected to a second electrical network by means of a DC DC converter.

The second electrical network comprises in particular a low-voltage onboard power supply network, in particular a low-voltage onboard power supply network with a battery. The second electrical network has a nominal voltage. That means that the second electrical network is operated, in the normal operation mode, at a voltage the value of which corresponds to the nominal voltage or that, in the normal operation mode, a voltage the value of which corresponds to the nominal voltage is present at the second electrical network. In this case, the nominal voltage is in particular a voltage value which is specified for example by manufacturers or suppliers.

The first electrical network is discharged by means of the DC DC converter. At the same time, the DC DC converter transfers energy into the second electrical network. The voltage of the first electrical network is therefore present as input voltage at the input side of the DC DC converter and that of the second electrical network is therefore present as output voltage at the output side of the DC DC converter. The output voltage of the DC DC converter can be set by controlling the DC DC converter.

For discharging, the output voltage of the DC DC converter is set to a first voltage value, which is larger than the nominal voltage of the second electrical network. According to the invention, for discharging, the output voltage of the DC DC converter is set to the first voltage value for a predefinable first period of time.

By means of the limitation of the period of time during discharging with an output voltage which corresponds to the first voltage value, long-lasting electrical and thermal loading voltage spikes are avoided in the onboard power supply network. Therefore, the voltage remains at a statically permissible level during the majority of the discharging of the intermediate circuit.

Advantageously, such a method for discharging by means of the DC DC converter can be provided, in which the onboard power supply network and the components connected thereto are not damaged.

In order that the discharge of the first electrical network via the DC DC converter into the second electrical network is possible, a DC DC converter with regulatable or controllable output voltage is required. If a DC DC converter of this type is used, the energy to be dissipated can be directly transferred into the second electrical network or, in a particularly advantageous manner, can be stored in a low-voltage battery. During the discharge into the low-voltage battery, the control of the DC DC converter is to be performed in such a way that, for the duration of the discharge, the output voltage of the DC DC converter is raised to a higher voltage level than that of the low-voltage battery, as a result of which it is ensured that the low-voltage battery is charged.

In one configuration of the invention, for discharging, the output voltage of the DC DC converter is subsequently set to a second voltage value, which is larger than the first voltage value, for a predefinable second period of time. In the event that no discharge has taken place in the first step of the method, since the first voltage value was not larger than the present onboard power supply network voltage, the output voltage is raised to a second, larger voltage value in a second step. Thus, for the predefinable second period of time, that is to say for short, dynamic periods, the rules of the specification for static voltage stipulations are violated. The predefinable second period of time is however chosen to be short enough that the rules of the specification in relation to the dynamic maximum voltage profiles are not violated. Advantageously, a discharge is therefore initiated. In order to avoid long-lasting overvoltages in the onboard power supply network with the accompanying damage to components in the onboard power supply network, the duration of the discharge is limited by means of a second period of time being stipulated.

In another configuration of the invention, for discharging, the output voltage of the DC DC converter is set to the first voltage value after the predefined second period of time has expired.

Through the reduction of the output voltage, the electric loading of the onboard power supply network is advantageously reduced to a permissible, in particular statically permissible, value.

In one configuration of the invention, the method is repeated until a predefinable discharge time has expired or the method is repeated until the input voltage of the DC DC converter is lower than a predefinable third voltage value. Predefining a discharge time, for example 10 seconds or 5 seconds up to 30 seconds, advantageously makes it possible to end the discharge process and switch off the connected components after a predefinable period of time. An undesired energy transfer from the first into the second electrical network is thus prevented. Repeating the method until a third voltage value, for example 60 volts, in the first electrical network is undershot advantageously makes possible a method in which no electrical voltages which are hazardous to life are present at the first network, in particular a traction network, after the completion of the method. After the discharge time has expired, the DC DC converter is switched off, the voltage, in particular low voltage, in the second electrical network settles back to its original value and the method is ended.

In one configuration of the invention, the first voltage value corresponds to a statically maximum permissible voltage, for example according to a specification, of the second electrical network, for example 16 volts. Therefore, the first voltage value corresponds to an electrical voltage for whose level all of the components connected in the onboard power supply network are permanently designed. Advantageously, therefore, the components are not damaged during these discharge phases.

In one configuration of the invention, the first period of time is longer than the minimum permissible period of time between dynamically maximum permissible voltages of the second electrical network. For example, it is stipulated in the specifications that the time between dynamically maximum permissible voltages is at least one second. During the first period of time, the first voltage value is present at the onboard power supply network. As a result of the first period of time being longer than the minimum permissible period of time between dynamically maximum permissible voltages of the second electrical network, the onboard power supply network is advantageously not overloaded and, for example, the specification is not violated.

In another configuration of the invention, the second voltage value is larger than the statically maximum permissible voltage but smaller than the dynamically maximum permissible voltage, for example 35 volts, of the second electrical network. The larger the second voltage value, the greater the electrical power transferred from the first electrical network into the second electrical network during the discharge process. Advantageously, an actual discharge of the first electrical network is thus ensured by means of the setting of the second voltage value and, at the same time, an overloading of the onboard power supply network due to an excessively high electrical voltage is avoided.

In another configuration of the invention, the second period of time is shorter than the dynamically maximum permissible period of time for the dynamically maximum permissible voltage of the second electrical network. The maximum permissible period of time for dynamically maximum permissible voltages (load dump) is 400 ms, for example. Therefore, the second period of time is limited to 100-200 ms, for example.

Furthermore, a device according to the invention for discharging a first electrical network is provided. The first electrical network comprises in particular an intermediate circuit, which comprises in particular an intermediate-circuit capacitor. The first electrical network is connected to a second electrical network by means of a DC DC converter. The second electrical network comprises in particular an onboard power supply network or a low-voltage onboard power supply network, in particular a low-voltage onboard power supply network with a battery. The first electrical network is discharged by means of the DC DC converter. At the same time, the DC DC converter transfers electrical energy into the second electrical network. Means are provided for discharging, said means setting the output voltage of the DC DC converter to a first voltage value, which is larger than the nominal voltage of the second electrical network. According to the invention, the means for discharging set the output voltage of the DC DC converter to the first voltage value for a predefinable first period of time.

By means of the provision of a device of this type with means which limit the period of time during discharging with an output voltage which corresponds to the first voltage value, long-lasting electrical and thermal loading voltage spikes are avoided in the onboard power supply network. Advantageously, such a device for discharging by means of the DC DC converter can be provided, in which the onboard power supply network and the components connected thereto are not damaged.

In another configuration of the device according to the invention, the means control the DC DC converter according to one or more of the aforesaid method steps. Advantageously, a device for a reliable discharging of the first electrical network without electrical overloading of the second electrical network is thus provided.

Furthermore, an electrical system according to the invention is provided. Said electrical system comprises a DC DC converter which can be connected to a first and a second electrical network in order to transport energy from the first into the second electrical network, and an above-described device according to the invention for performing the method according to the invention. Advantageously, an electrical system for a reliable discharging of the first electrical network without electrical overloading of the second electrical network is thus provided.

Moreover, the energy from the first electrical network is advantageously dissipated via the loads of the low-voltage onboard power supply network or of the onboard power supply network, or, in a further likewise particularly advantageous configuration, is stored in a connected low-voltage battery.

The charge to be dissipated from the first electrical network during the discharging process is, for example, stored in the low-voltage battery or used to supply the loads of the onboard power supply network. It is thus advantageously not converted into heat. Unnecessary heating is avoided.

A particularly advantageous use of the invention is possible in hybrid drives in vehicles or in electrically driven vehicles.

It goes without saying that the features, properties and advantages of the method according to the invention correspondingly apply or are applicable to the device according to the invention, and vice versa, and respectively to the electrical drive system.

Further features and advantages of embodiments of the invention can be found in the following description with reference to the appended drawings.

DETAILED DESCRIPTION

Figure 1:
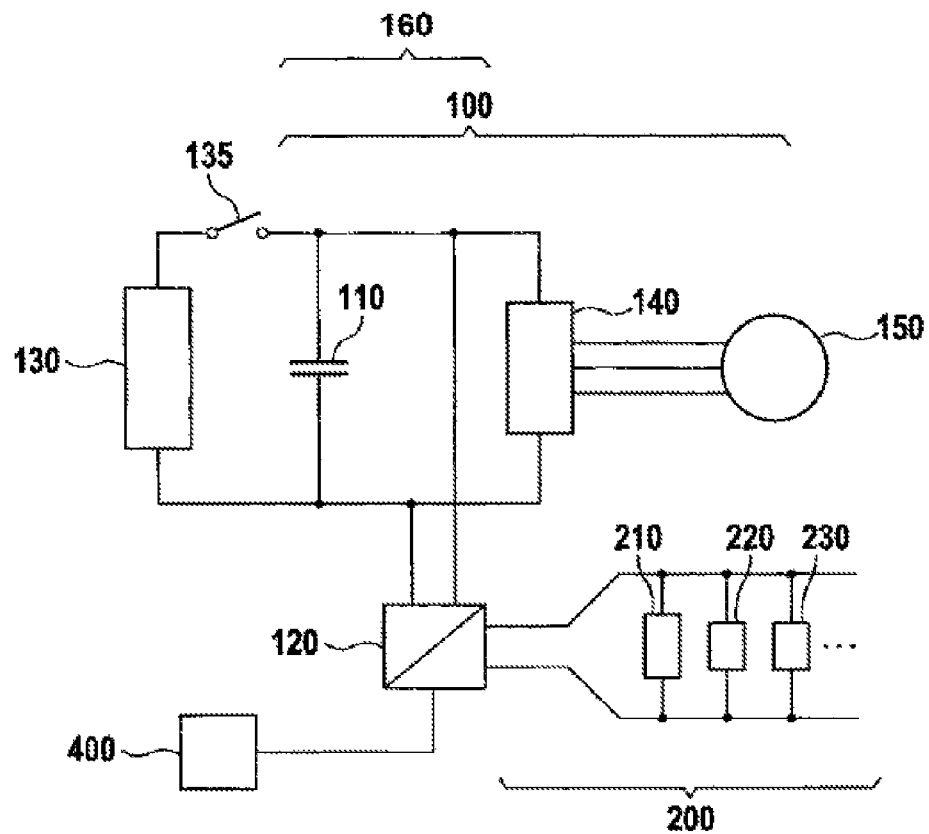
FIG. 1 schematically shows a first and a second electrical network with a DC DC converter connected therebetween, FIG. 2 schematically shows a method for discharging a first electrical network into a second electrical network by means of a DC DC converter, and FIG. 3 schematically shows the profile of the output voltage of a DC DC converter during discharging of a first electrical network into a second electrical network by means of the DC DC converter.

In the figures, elements, features and components which are the same and have the same function are—unless otherwise stated—in each case provided with the same reference signs. It goes without saying that, for reasons of clarity, components and elements in the drawings are not necessarily reproduced to scale.

Further possible configurations and developments and implementations of the invention also comprise combinations—not cited explicitly—of features of the invention that are described above or below.

EMBODIMENTS OF THE INVENTION

FIG. 1 shows a first electrical network 100. Said first electrical network 100 is used, for example, to supply an electrical machine 150 for driving a vehicle (not shown). For this purpose, the electrical energy in the form of a DC voltage from a high-voltage battery 130 is converted into a three-phase supply voltage by means of an inverter 140 and is fed to the electrical machine 150 when the switch 135 is closed. The intermediate circuit 160 of the first electrical network further comprises an intermediate-circuit capacitor 110 for reducing the voltage fluctuations in the first electrical network during the operation of the switches of the inverter 140 for generating the three-phase supply voltage of the electrical machine 150. When the vehicle is parked, switched off and the switch 135 is opened, electrical energy with a high voltage which is hazardous to life remains in the capacitor 110. In order to avoid endangering life, the first electrical network 100 and in particular the intermediate circuit 160 and in particular the capacitor 110 are discharged. The DC DC converter 120, which is used to supply the second electrical network 200 from the first electrical network 100 during normal operation, is for this purpose controlled according to the invention via means 400, for example a control device. The second electrical network 200 is in particular a low-voltage onboard power supply network or onboard power supply network of a vehicle, for supplying conventional loads and control devices 220, 230 in a vehicle. Examples of loads of this type are a heating system, an air-conditioning system, a lighting system or systems for vehicle dynamics. The second electrical network 200 comprises a battery 210, in particular a low-voltage battery, for starting up a vehicle. Said battery supplies the loads and control devices 220, 230 with electrical energy.

Figure 2:
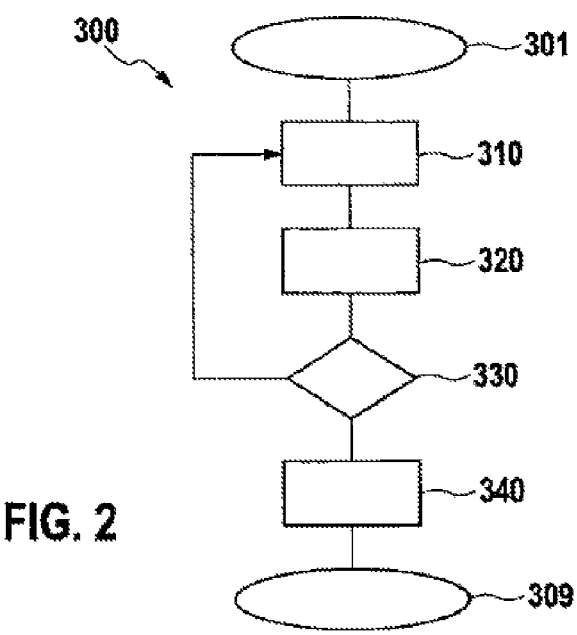

FIG. 2 shows a method 300 for discharging a first electrical network 100 by means of a DC DC converter 120 into a second electrical network 200. The method for discharging is started with step 301. Then, in step 310, the output voltage Ua of the DC DC converter 120 is set to a first voltage value U1, which is larger than the nominal voltage Un of the second electrical network 200. Said first voltage value U1 remains set until a predefinable first period of time T1 has elapsed. In a further step 320, the output voltage Ua of the DC DC converter 120 is set to a second voltage value U2, which is larger than the first voltage value U1, for a predefinable second period of time T2. After the predefined second period of time T2 has elapsed, the method, in a step 330, jumps back to step 310, in which the output voltage Ua is set to the first voltage value U1. Step 330 also involves verifying whether a predefinable discharge time Te has elapsed since the beginning of the discharging process at the instant Tb in step 301, or whether the input voltage Ue of the DC DC converter 120 is smaller than a predefinable third voltage value U3. Depending on the application, the method is continued with step 340 after at least one of the conditions is fulfilled. In said step 340, the components involved in the discharging process are switched off. The method ends with step 309.

Figure 3:
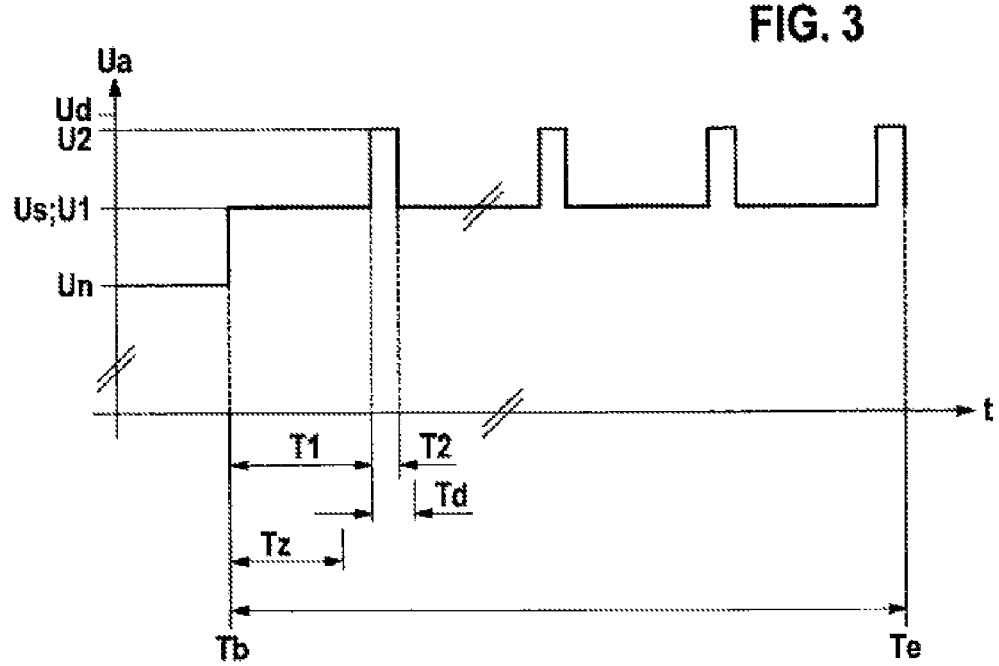

FIG. 3 shows a diagram of the profile of the output voltage Ua of a DC DC converter over the time t during discharging of a first electrical network 100 into a second electrical network 200 by means of a DC DC converter 120. The method begins at the instant Tb. At this instant, the output voltage Ua of the DC DC converter is raised to the first voltage value U1, which is larger than the nominal voltage Un of the second network and in particular corresponds to the statically maximum permissible voltage Us of the second electrical network 200. Said first voltage value U1 remains set until a predefinable first period of time T1 has elapsed. Then, the output voltage Ua of the DC DC converter 120 is set to a second voltage value U2, which is larger than the first voltage value U1, for a predefinable second period of time T2. Once the predefined second period of time T2 has expired, the output voltage Ua is reduced to the first voltage value U1. The described voltage profile of the output voltage Ua is repeated until a predefinable discharge time Te has elapsed since the instant of the beginning Tb of the discharging process or until the input voltage Ue of the DC DC converter 120 has dropped to a value which is smaller than a predefinable third voltage value U3. During the method, in particular the first period of time T1 is longer than the minimally permissible period of time Tz between dynamically maximum permissible voltages Ud of the second electrical network 200. Furthermore, in particular the second voltage value U2 is larger than the statically maximum permissible voltage Us but smaller than the dynamically maximum permissible voltage Ud of the second electrical network 200. Moreover, in particular the second period of time T2 is shorter than the dynamically maximum permissible period of time Td for the dynamically maximum permissible voltage Ud of the second electrical network 200.

What is claimed is:

1. A method for discharging an electrical charge from a first electrical network including a capacitor, the first electrical network being a high-voltage network and connected via a switch to a high-voltage battery into a second electrical network including a power supply having a nominal voltage, the second electrical network being a low-voltage network, the method comprising:
   connecting the first electrical network to the second electrical network by means of a DC-DC converter having an adjustable output,
   discharging the capacitor of the first electrical network by means of the DC-DC converter and, simultaneously transferring, via the DC-DC converter, electrical energy into the second electrical network when the switch is opened,
   setting, for discharging, the output voltage of the DC-DC converter to a first voltage value, which is larger than the nominal voltage, for a predefined first period of time, and
   subsequently setting the output voltage of the DC-DC converter to a second voltage value, which is larger than the first voltage value, for a predefined second period of time.

2. The method according to claim 1, further comprising:
   subsequently setting the output voltage of the DC-DC converter to the first voltage value after the predefined second period of time has expired.

3. The method according to claim 2, further comprising:
   repeating the method until a predefined discharge time has expired or until an input voltage of the DC-DC converter is lower than a predefined third voltage value.

4. The method according to claim 1, wherein the first voltage value corresponds to a statically maximum permissible voltage of the second electrical network.

5. The method according to claim 1, wherein the first period of time is longer than a minimum permissible period of time between dynamically maximum permissible voltages of the second electrical network.

6. The method according to claim 1, wherein the second voltage value is larger than the statically maximum permissible voltage but smaller than the dynamically maximum permissible voltage of the second electrical network.

7. The method according to claim 1, wherein the second period of time is shorter than the dynamically maximum permissible period of time for the dynamically maximum permissible voltage of the second electrical network.

8. The method for discharging a first electrical network according to claim 1, wherein the first electrical network is in an electric vehicle and wherein the second electrical network is in the electric vehicle.

9. A device for discharging an electrical charge from a first electrical network including a capacitor, the first electrical network being a high-voltage network into a second electrical network including a power supply, the second electrical network being a low-voltage network,
   wherein the first electrical network is connected to the second electrical network by means of a DC-DC converter,
   wherein the second electrical network has a nominal voltage and the DC-DC converter has an adjustable output voltage,
   the device comprising:
      a control device configured to
         control the DC-DC converter to discharge the electrical charge from the capacitor of the first electrical network and, at the same time, control the DC-DC converter to transfer electrical energy into the second electrical network when the switch is opened, wherein, for discharging, the output voltage of the DC-DC converter is set to a first voltage value, which is larger than the nominal voltage of the second electrical network,
         control the DC-DC converter in such a way that, for discharging, the output voltage of the DC-DC converter is set to a first voltage value for a predefined first period of time, and
         subsequently set the output voltage of the DC-DC converter to a second voltage value, which is larger than the first voltage value, for a predefined second period of time.

10. An electrical system comprising a DC-DC converter connected to a first and a second electrical network in order to transport energy from the first into the second electrical network, having a device according to claim 9.

* * * * *